United States Patent
Ortiz et al.

(10) Patent No.: US 10,267,454 B1
(45) Date of Patent: Apr. 23, 2019

(54) SECURITY MONITORING SYSTEM

(71) Applicant: TP-Link Research America Corp., San Jose, CA (US)

(72) Inventors: Elliot L. Ortiz, San Francisco, CA (US); Hirotomi Teranishi, San Jose, CA (US); Daniel K. Harden, Palo Alto, CA (US); Mukund Rajukumar, San Jose, CA (US); Cheng Li, Shenzhen (CN)

(73) Assignee: TP-Link Research America Corp, San Jose, CA (US)

( * ) Notice: Subject to any disclaimer, the term of this patent is extended or adjusted under 35 U.S.C. 154(b) by 0 days.

(21) Appl. No.: 15/864,967

(22) Filed: Jan. 8, 2018

(51) Int. Cl.
| | |
|---|---|
| G03B 17/00 | (2006.01) |
| F16M 13/02 | (2006.01) |
| F16M 11/04 | (2006.01) |
| F16B 1/00 | (2006.01) |
| F16M 11/14 | (2006.01) |
| F16L 3/04 | (2006.01) |
| G03B 17/56 | (2006.01) |
| F16M 11/20 | (2006.01) |

(52) U.S. Cl.
CPC .............. F16M 13/022 (2013.01); F16B 1/00 (2013.01); F16L 3/04 (2013.01); F16M 11/041 (2013.01); F16M 11/14 (2013.01); F16M 11/2028 (2013.01); G03B 17/561 (2013.01); *F16B 2001/0035* (2013.01)

(58) Field of Classification Search
USPC ........................................................ 396/427
See application file for complete search history.

(56) References Cited

U.S. PATENT DOCUMENTS

| | | | | |
|---|---|---|---|---|
| D433,432 | S * | 11/2000 | Prather ........................ | D16/202 |
| 7,163,181 | B2 * | 1/2007 | Omps .................. | F16C 11/0619 248/181.1 |
| 7,387,453 | B2 | 6/2008 | Arbuckle | |
| 7,556,228 | B2 * | 7/2009 | Liow ...................... | F16M 13/00 248/206.5 |
| 9,535,311 | B2 | 1/2017 | Bergsten et al. | |
| 9,689,527 | B2 * | 6/2017 | Franklin ................. | F16M 13/02 |
| 2005/0247845 | A1 * | 11/2005 | Li ........................... | F16M 11/14 248/346.5 |
| 2007/0114346 | A1 * | 5/2007 | Omps .................. | F16C 11/0619 248/181.1 |
| 2009/0196597 | A1 * | 8/2009 | Messinger ............. | F16M 11/14 396/427 |
| 2013/0078855 | A1 * | 3/2013 | Hornick ................. | H01R 13/73 439/571 |
| 2015/0198865 | A1 * | 7/2015 | Chang .................. | G03B 17/561 396/428 |

(Continued)

FOREIGN PATENT DOCUMENTS

| | | |
|---|---|---|
| CN | 202121689 U | 1/2012 |
| CN | 102445810 A | 5/2012 |

(Continued)

*Primary Examiner* — Rodney E Fuller (57) ABSTRACT

A security monitoring system includes a sensor and a magnetic bracket. The sensor may include a ferromagnetic convex cover. The magnetic bracket may include a concave surface. The sensor is configured to be magnetically releasably mounted onto the magnetic bracket by constructing the convex cover of the sensor to snug with the concave surface of the magnetic bracket.

17 Claims, 11 Drawing Sheets

(56) References Cited

U.S. PATENT DOCUMENTS

| | | | | |
|---|---|---|---|---|
| 2016/0069510 A1* | 3/2016 | Chen | ................... | F16M 13/022 |
| | | | | 248/206.5 |
| 2017/0067595 A1* | 3/2017 | Yun | ................... | B60R 11/0241 |
| 2017/0255083 A1 | 9/2017 | Donaldson | | |
| 2018/0013271 A1* | 1/2018 | Goulden | ................. | H02G 3/04 |
| 2018/0013934 A1* | 1/2018 | Germe | ............... | G03B 17/561 |
| 2018/0177285 A1* | 6/2018 | MacDonald | ............. | A45F 5/02 |
| 2018/0187828 A1* | 7/2018 | Law | ................... | F16M 13/022 |

FOREIGN PATENT DOCUMENTS

| | | |
|---|---|---|
| DE | 202004010992 U1 | 11/2005 |
| KR | 101716474 B1 | 3/2017 |
| WO | WO2004001941 A1 | 12/2003 |
| WO | WO2015187326 A1 | 12/2015 |
| WO | WO2017140915 A1 | 8/2017 |

\* cited by examiner

SECURITY MONITORING SYSTEM

CROSS-REFERENCE TO RELATED APPLICATIONS

This application claims the benefit of U.S. application Ser. No. 29/627,546, filed Nov. 28, 2017. The entire disclosure of the application referenced above are incorporated by reference.

FIELD

The present disclosure relates to a security monitoring system with a mount, and in particular, the system is configured to be continuously adjusted and securely held to any desired angular position.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The technology is related to a security monitoring system including a sensor or security monitoring device (e.g., a portable sensor, a camera, etc.) and a bracket, which system can be positioned for monitoring indoor/outdoor activities. The bracket is easy to use and allows the sensor to be continuously adjusted to various positions to cover a wide range of views of a monitored area.

A monitoring system is often configured to direct a sensor to an area of interest by mounting/attaching the sensor to a bracket. The sensor is usually screwed or bolted to the bracket so that the sensor is tilted and panned at a particular angle. The sensor may be repositioned by unscrewing or prying open the mechanism using a tool. As such, adjusting the position of the sensor can be cumbersome and time-consuming and accurately fine-tuning the sensor is also very challenging. It is very important to have a stable, adjustable mounting bracket that allows a flexible positioning and orientation of the sensor.

SUMMARY

The present disclosure generally provides a monitoring system having a magnetic bracket that allows easily mounting, positioning, orienting, and adjusting of a sensor. The sensor may be an image sensor or other sensor device. The sensor generally includes a ferromagnetic convex surface configured to be magnetically mounted onto a magnetic bracket having a concave surface. The mounting mechanism provides an instant set-up, extremely stable, and easy to use and allows the sensor(s) to be continuously adjusted to different position to aim at different angles of a monitoring area. In one example, the bracket may include a ring that holds multiple magnets (uniformly) distributed around the ring. When a sensor with a ferromagnetic surface sits on/contacts with the ring, the sensor is held firmly at multiple points by the magnets distributed on the ring. The sensor can be easily adjusted by hand to view/monitor different areas on all four sides (top/bottom/left/right) of the device without the need for any tools to unscrew or pry open anything.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
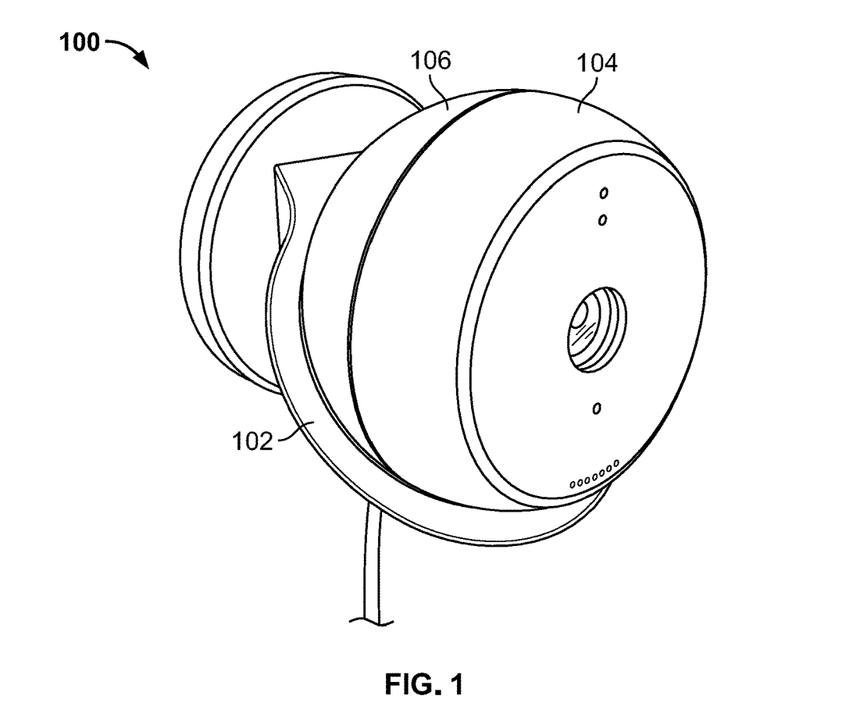
FIG. 1 is a perspective view showing an example security monitoring system including a bracket according to the principles of the present disclosure.

FIG. 1 illustrates an example security monitoring system 100 including a bracket 102 and a sensor 104. The sensor 104 generally includes a ferromagnetic convex cover 106, and the bracket 102 is magnetic and generally has a concave surface shaped and sized to snug with the convex cover 106 and securely hold the sensor 104 by attracting the sensor 104 by magnetic force. Specifically, the surface curvature of the convex cover 106 matches the surface curvature of the concave surface. As such, the sensor 104 can be magnetically releasably mounted onto the bracket 102 and continuously adjusted to various positions in relation to the bracket 102 without any tools.

Figure 2:
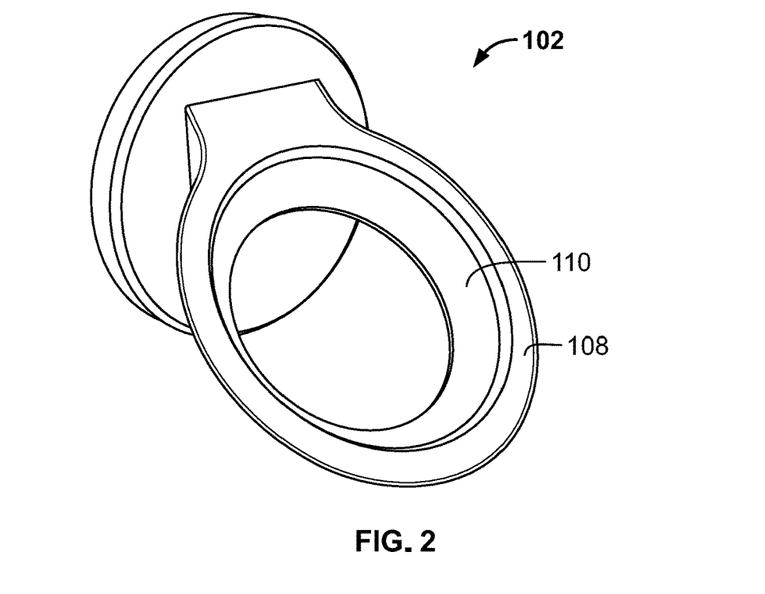
FIG. 2 is a perspective view showing the bracket of FIG. 1 according to the principles of the present disclosure.

FIG. 2 illustrates the example bracket 102 of FIG. 1. the bracket 102 may include a crater-shaped ring 108 having the concave surface 110. As shown in FIG. 2, the crater-shaped ring 108 has generally a substantially uniform thickness.

Figure 3:
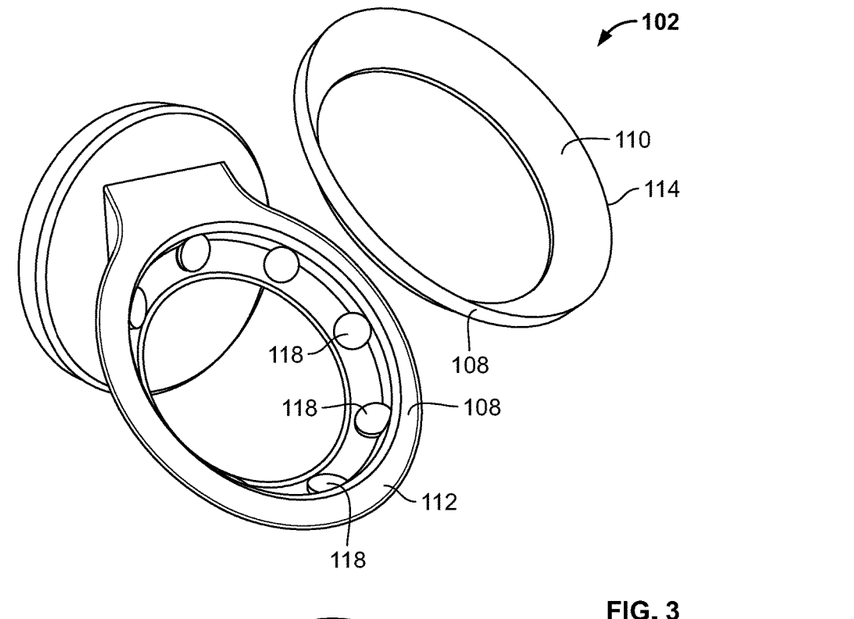
FIGS. 3-4 are exploded views of the bracket of FIG. 2 according to the principles of the present disclosure.
Figure 4:
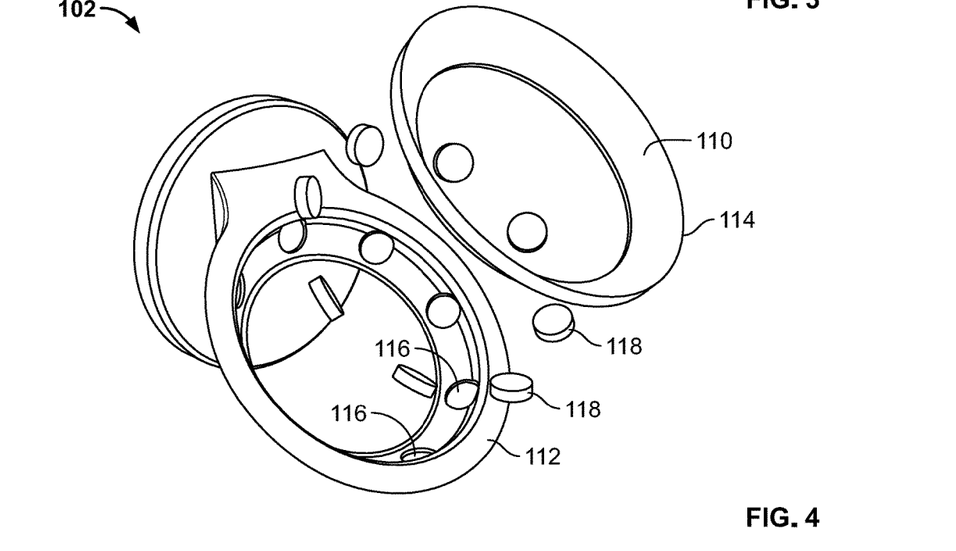

FIGS. 3 and 4 are perspective exploded views of the bracket 102. The bracket 102 is shown disassembled. The crater-shaped ring may include two mating parts, a base ring 112 and a cover ring 114 having the concave surface 110. Multiple slots 116 may be defined on the surface of the base ring 112 to hold multiple magnets 118. In one example, the slots formed substantially equally spaced. As such, the multiple magnets 118 respectively placed in the slots are distributed uniformly along the crater-shaped ring. The magnets can be for example, permanent magnets, electromagnets, or other temporary magnets. The magnets 118 may be glued within the slots 116. Alternatively, the magnets 118 can be fastened to the base ring 112 without the slots 116. The cover ring 114 may be adapted to be snapped on the base ring 112 to cover the magnets 118 to thereby integrally form the crater-shaped ring 108. Multiple magnets 118 are substantially evenly distributed underneath the concave surface 110 to produce strong magnetic attractive forces to firmly pull the ferromagnetic cover 106 of the sensor 104 at multiple points by the magnets when the sensor is positioned on the bracket. Such configuration can allow larger contacting area with the bracket and hold the sensor more securely than the configuration having a centralized attaching contact point/area. The sensor 104 may be continuously repositioned by moving the sensor 104 into a new position respective to the crater-shaped ring 108 to thereby reorient the sensor 104 with a different field of view. Although the example magnets 118 shown in FIGS. 3-4 are button-shaped, the magnets may include other shapes.

Figure 5:
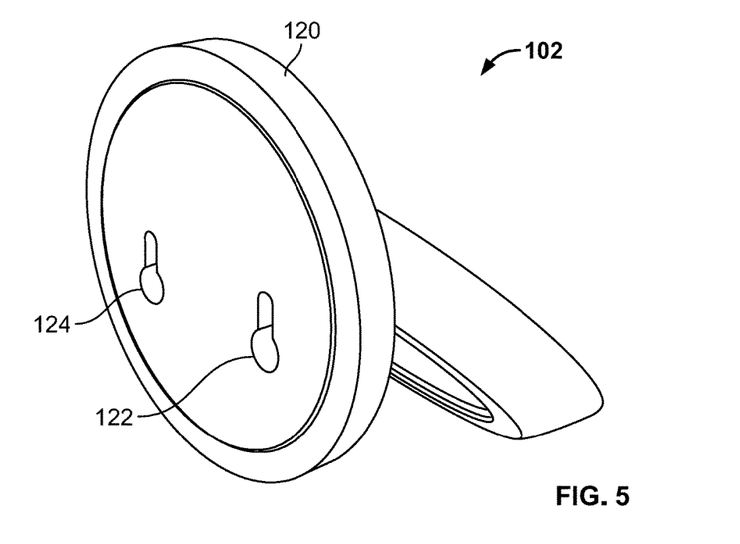
FIG. 5 is a perspective view showing an example mounting plate integrated with the bracket of FIG. 2 according to the principles of the present disclosure.

FIG. 5 shows an example mounting plate 120 integrated with the bracket 102. The mounting plate 120 may include mounting fitting structures to be secured to a surface (e.g., a vertical wall, etc.) or similar structure (e.g., a horizontal surface, etc.). As shown in FIG. 5, the mounting plate 120 may include, for example, holes 122, 124 adapted to receive fasteners such as tacks, screws, nails, and wall anchors.

Figure 6:
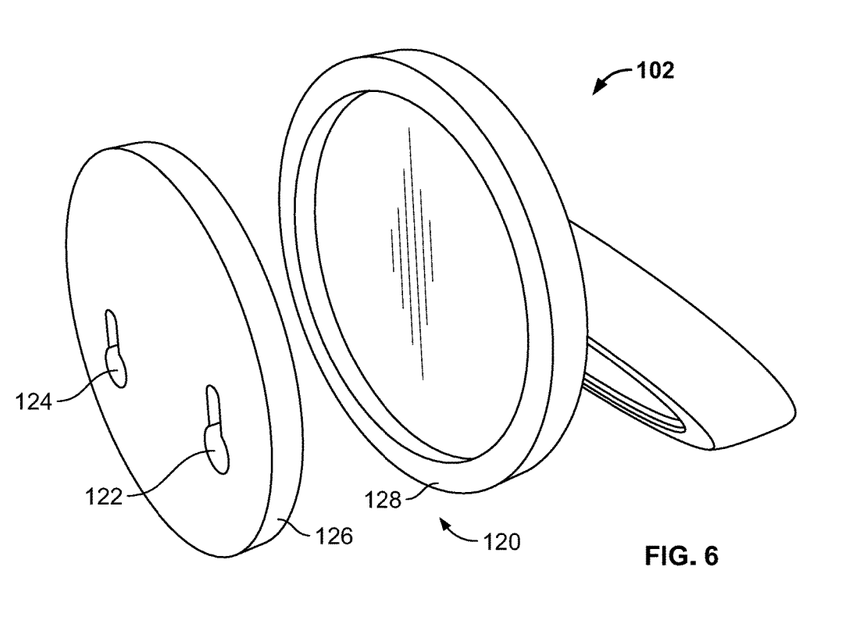
FIG. 6 is an exploded view of the mounting plate integrated with the bracket of FIG. 2 according to the principles of the present disclosure.

FIG. 6 is a perspective exploded view of the mounting plate 120 integrated with the bracket 102. The mounting plate 120 is shown disassembled with two parts, a mounting base 126 and the mounting cover 128. Such a construction can enable the bracket 102 to have various orientations after the mounting base 126 is secured to the wall or similar surface by snapping/clamping/clasping/attaching the mounting cover 128 to the mounting base 126 at various directions. The example bracket 102 is constructed to have an angle between the mounting plate 120 and the crater-shaped ring 108. As such, when the mounting plate 120 is adapted to be mounted on a surface in various orientations, the sensor 104 can face various directions.

Figure 7:
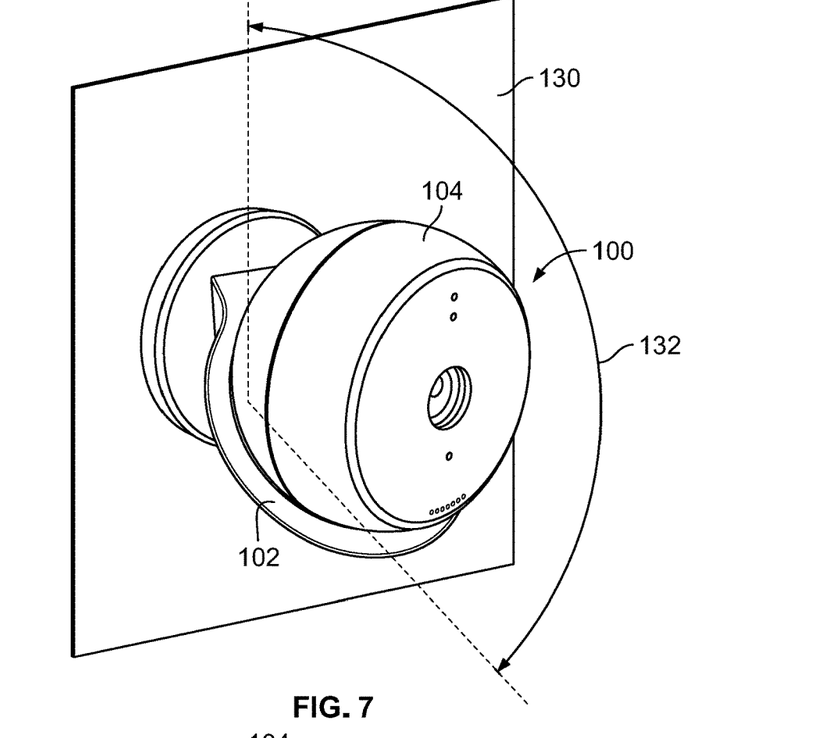
FIG. 7 is a perspective view showing an example mounting installation of the example security monitoring system of FIG. 1 according to the principles of the present disclosure.
Figure 8:
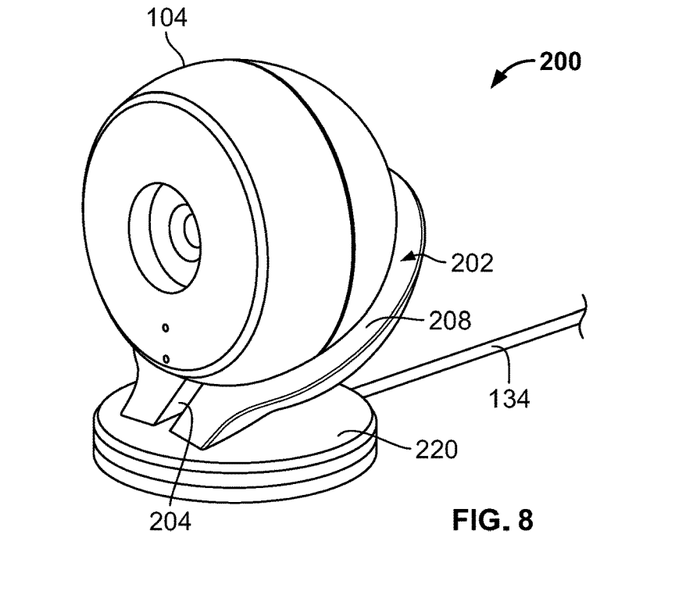
FIGS. 8-13 are perspective views showing another example security monitoring system including another example bracket according to the principles of the present disclosure.
Figure 9:
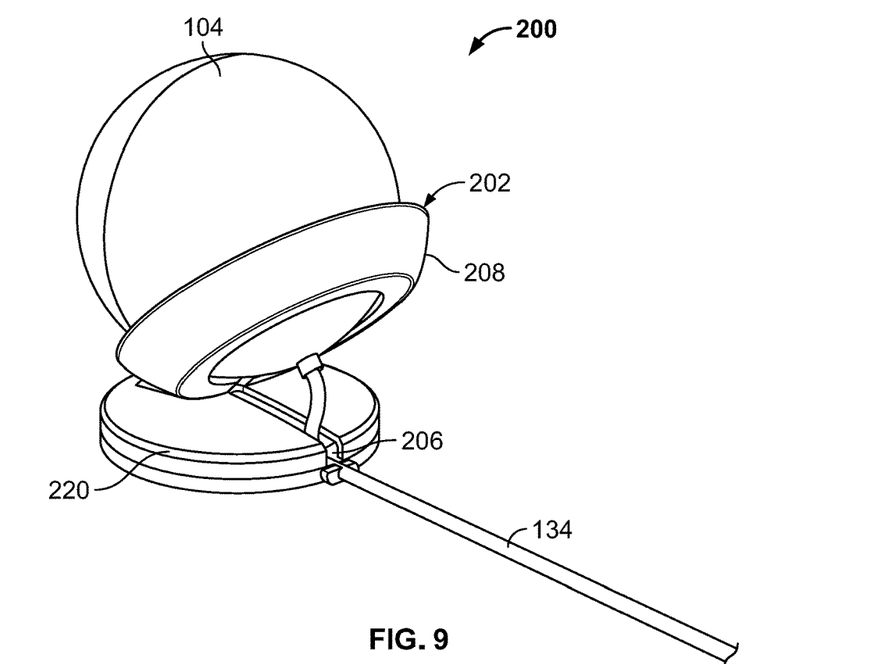
Figure 10:
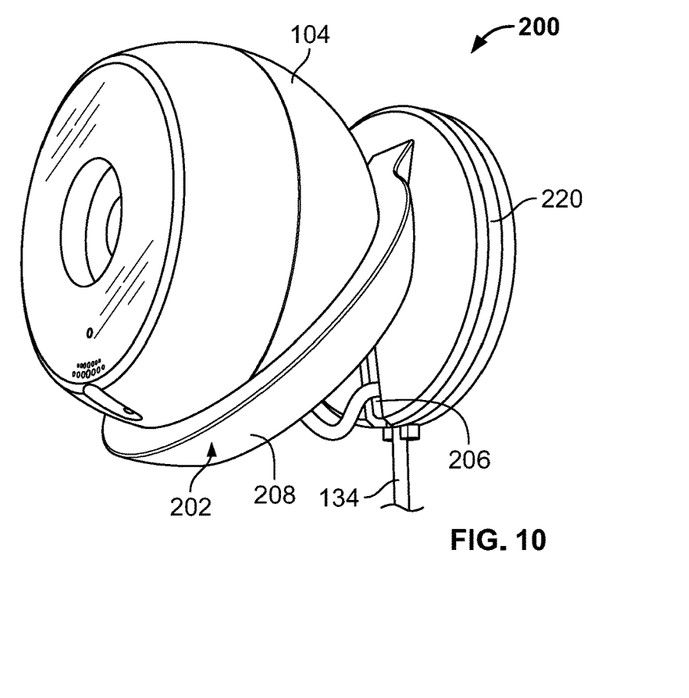
Figure 11:
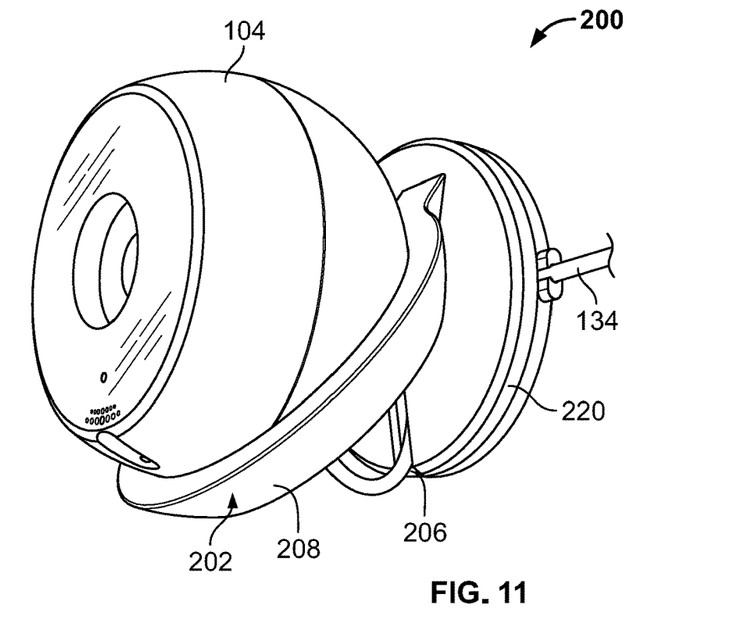
Figure 12:
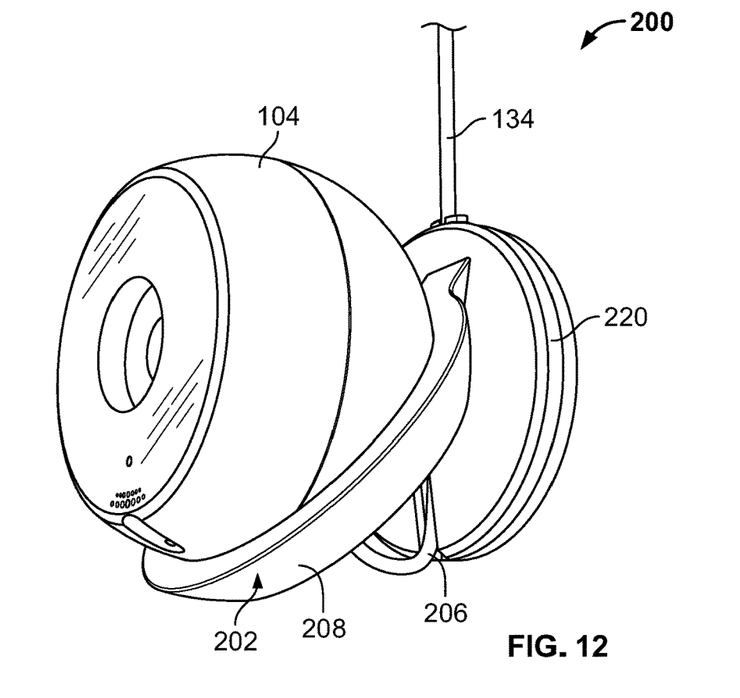
Figure 13:
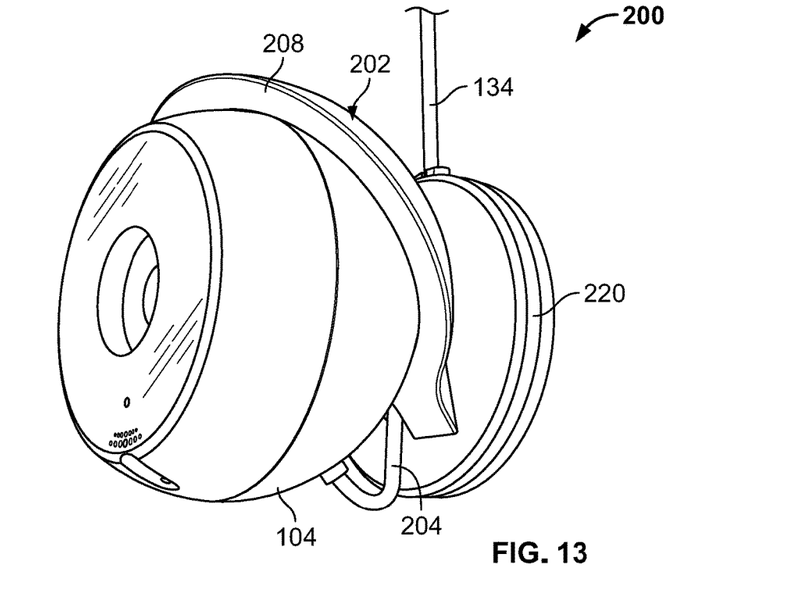

FIG. 7 is a perspective view showing an example installation of mounting the security monitoring system 100 to a wall 130. In the illustrated example mounting position of the bracket 102, the sensor 104 can be rotated to different positions to cover a wide field of view 132.

FIGS. 8-13 are perspective views showing another example security monitoring system 200 including another example bracket 202 and the sensor 104. The bracket 202 may include a slot/channel 204 located at the joint between the crater-shaped ring 208 and the mounting plate 220. Additionally, and/or alternatively, the bracket 202 may include a slot/channel 206 defined on the mounting plate 220 generally from the center to the edge of the mounting plate 220. The slots/channels 204 and 206 may be arranged/adapted to retain or guide a cable/wire 134 that is connected to the sensor 104 in different orientations/directions/paths As shown in FIGS. 9-13, the slots/channels 204 and 206 may be arranged aligned to each other or perpendicular to each other. Alternatively, the slots/channels 204 and 206 may be arranged to have different angles to retain/guide the cable/wire 134.

Figure 14:
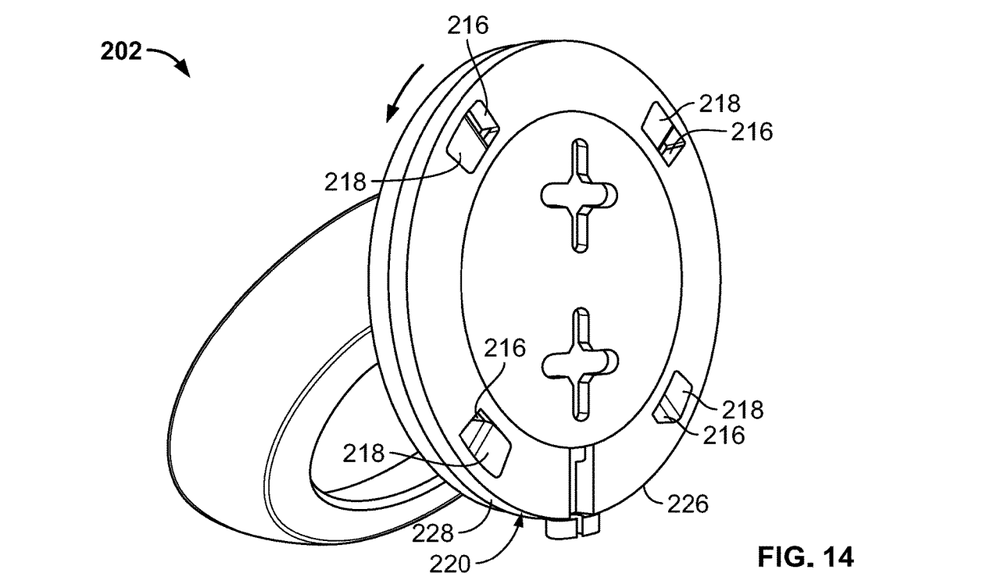
FIG. 14 is a perspective view showing another example mounting plate integrated with the bracket of FIGS. 8-13 according to the principles of the present disclosure.
Figure 15:
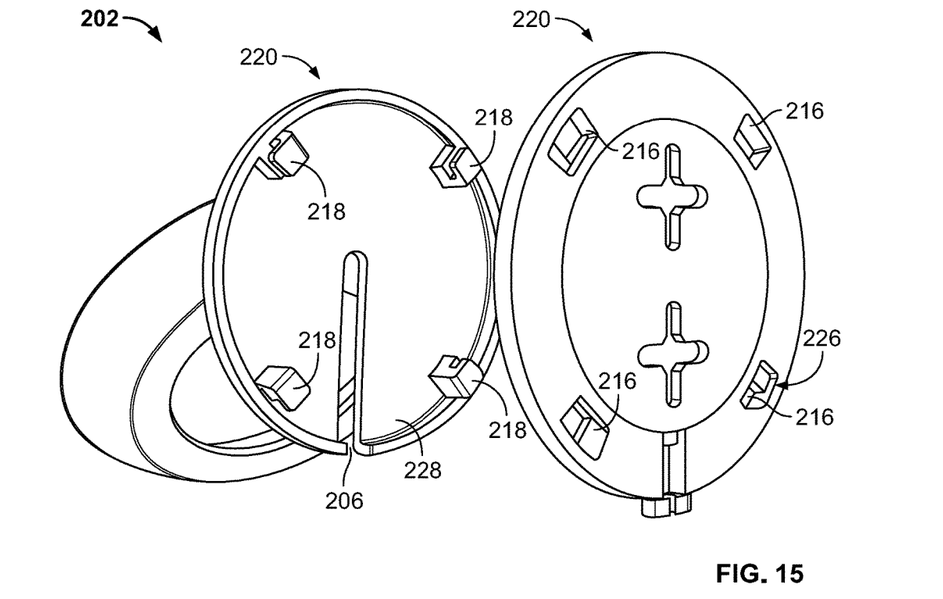
FIG. 15 is an exploded view of the mounting plate integrated with the bracket of FIG. 14 according to the principles of the present disclosure.

FIG. 14 is a perspective view showing the example mounting plate 220 integrated with the bracket 202. FIG. 15 shows the mounting plate 220 integrated with the bracket 202 disassembled with two parts, a mounting base 226 and a mounting cover 228. As shown in FIGS. 14 and 15, the mounting base 226 may include multiple tab slots 216 and the mounting cover 228 may include multiple tongues 218. For this example, the number of the tab slots 216 and the number of the tongues 218 are the same to form a locking structure. The mounting cover 228 is adapted to respectively insert its tongues 218 into the tab slots 216 and twist to lock. The shown example locking structure may enable four relative positions/orientations of the mounting cover 228 in relation to the mounting base 226 by selectively inserting the tongues 218 into successively various tab slots 216. As such, the relative position of slot/channel 204 in relation to the slot/channel 206 may change to retain/guide the cable/wire 134 in different ways, as shown in FIGS. 8-13. Alternatively, the number of the tab slots 216 of the mounting base 226 and the number of the tongues 218 of the mounting cover 228 can be different numbers to enable different relative positions/orientations of the mounting base 226 and the mounting cover 228 in relation to each other. The number of tab slots 216 can be any multiples of the number of tongues 218.

Similar to the security monitoring system 100, the security monitoring system 200 also allows the bracket 202 to have various orientations after the mounting base 226 is secured to the wall or similar surface by attaching the mounting cover 228 to the mounting base 226 at various directions.

Figure 16:
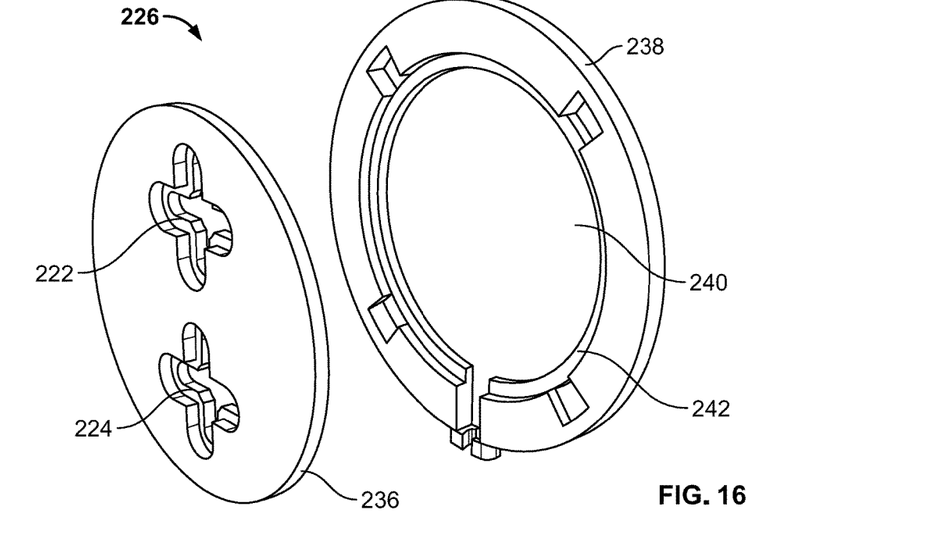
FIGS. 16-17 are perspective views showing the example mounting base of FIGS. 14-15 according to the principles of the present disclosure.
Figure 17:
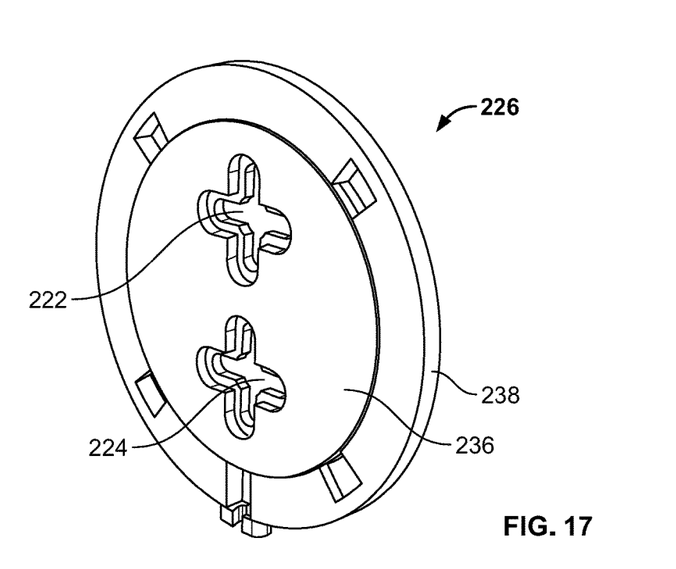

As shown in FIGS. 16-17, the example mounting base 226 may further include a mounting base plate 236 and an orientation ring 238. The orientation ring 238 generally includes an opening 240 with a smaller dimension than that of the mount base plate 236. Additionally, the orientation ring may include a thin shoulder 242 along the edge of the inner opening 240. The mount base plate 236 may include, for example, holes 222, 224 adapted to receive fasteners such as tacks, screws, nails, and wall anchors. As such, the mount base plate 236 can be pressed onto the orientation ring against the wall or similar surface to secure the orientation ring 238.

Figure 18A:
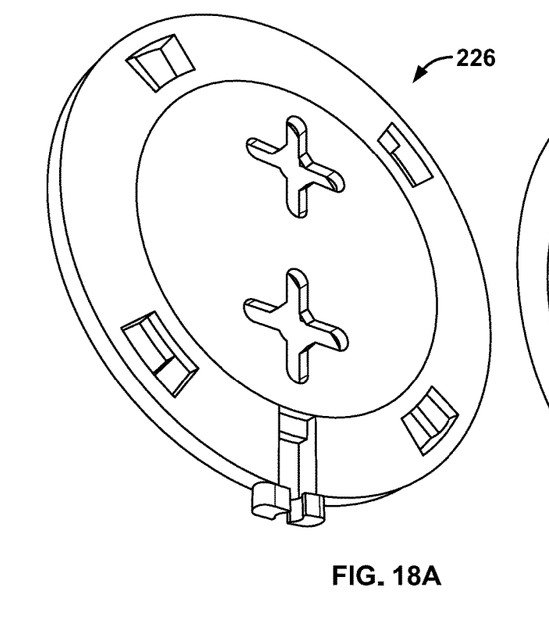
FIGS. 18A and 18B are perspective views showing the assembled mounting base of FIGS. 14-17 according to the principles of the present disclosure.
Figure 18B:
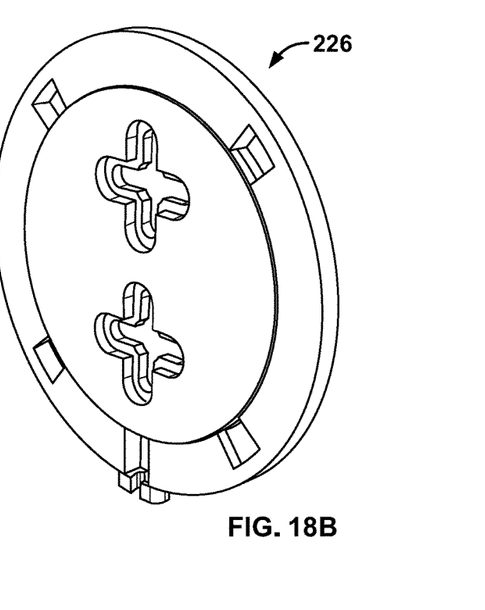

FIGS. 18A and 18B are perspective views respectively showing the two opposed sides of the assembled mounting base 226. Specifically, FIG. 18A shows the side of the assembled mounting base 226 that is adapted to attach to the wall or similar surface. FIG. 18B shows the opposed side of the assembled mounting base 226 that is adapted to receive the mounting cover 228 in FIG. 15.

Figure 19:
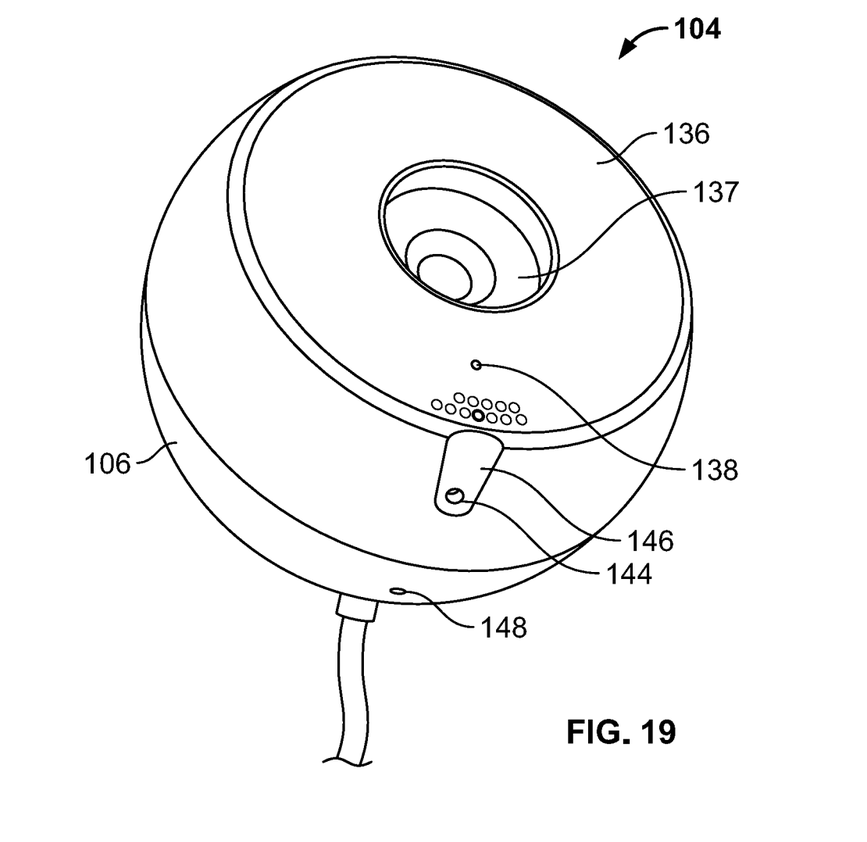
FIG. 19 is a perspective view showing an example monitoring device that is configured to be held by a bracket according to the principles of the present disclosure.

FIG. 19 shows an example monitoring device (e.g., the sensor 104) that is configured to be held/supported by the example bracket 102 or 202. the monitoring device may be, for example, a camera, a video camera, a mobile phone, a personal data assistant (PDA), a web camera, a computer, or the like.

The example monitoring device shown in FIG. 19 is a spherical dome shaped camera 104. The camera 104 may include a generally spherical dome shaped back with a ferromagnetic convex cover 106 and a generally flat surface 136. As previously described, the convex cover 106 may be shaped and sized to be snugged by the concave surface of the bracket 102 or 202. Additionally, the camera 104 may be securely held, or releasably attached/mounted onto or released from the magnetic bracket without any tool. In addition, the generally spherical dome shaped camera can maximize the internal space capacity.

Figure 20:
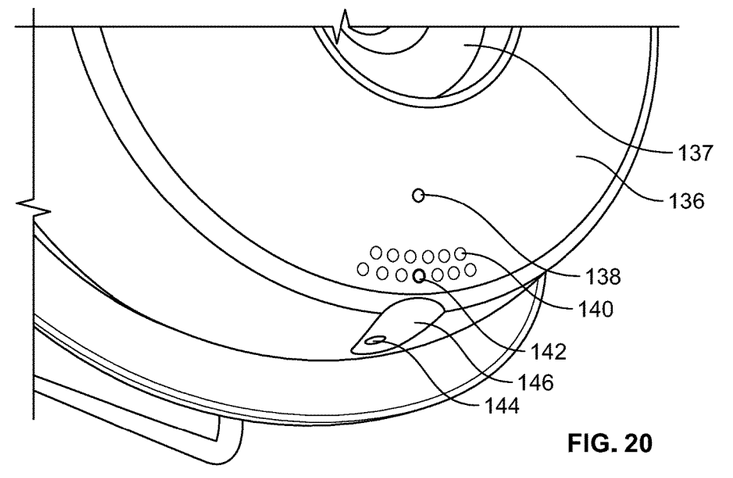
FIG. 20 is an enlarged perspective view showing a portion of the example monitoring device of FIGS. 19.

FIG. 20 is an enlarged perspective view showing a portion of the camera 104. As shown in FIGS. 19 and 20, the surface 136 may include a lens 137 to detect visual signals, a light sensor 138 to detect light levels, multiple speaker holes 140, an indicator 142 to indicate the operation status, and a microphone 144 to capture audio signals in the surroundings of the camera 104. The light sensor may be used, for example, to trigger a night vision mode of the camera 104. The speaker holes 140 may be configured for transmit the audio sounds from a user. The indicator 142 may include an LED to indicate the operation status. For example, blinking red indicates that the camera 104 has failed to connect to the network; green indicates that the camera 104 is online connected to the network, blinking amber and green may indicate that the camera 104 is setup mode and is not currently connected to any network;

As shown in FIGS. 19 and/or 20, the camera 104 may further include a microphone 144 on the surface of the camera 104 and a recess 146 defined in the vicinity of the microphone 144. When the portion surface having the microphone 144 is positioned to face the crater-shaped ring 108 or 208, the recess 146 may keep the crater-shaped ring 108 or 208 from blocking the microphone 144. Furthermore, the camera 104 may further include a reset button inside a hole 148. The reset button can be pressed for a period of time (e.g., 5 s) by inserting a needle into the hole 148 to factory reset the camera 104 (e.g., putting the camera in paring mode, resolving the issue of connecting the camera 104 to the network, etc.).

Figure 21:
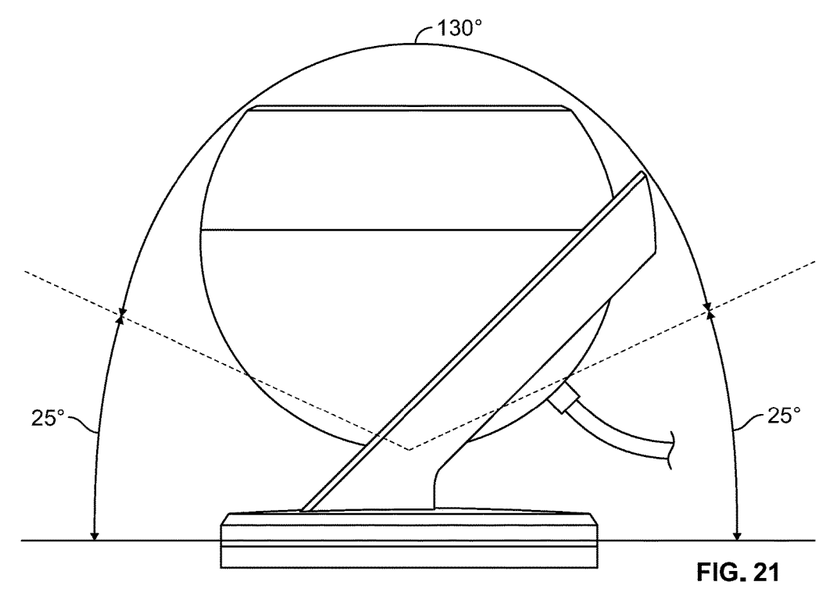
FIG. 21 is a diagram illustrating a field of view of the example monitoring device of FIG. 16 according to the principles of the present disclosure.

FIG. 21 is a diagram illustrating a example field of view of the camera 104. This example camera is configured to generally have a field of view of about 130 degrees. However, the camera can be configured to have a field of view that is more or less than 130 degrees. The mounting mechanism described in the present disclosure enables the camera 104 to rotate about the bracket 102 or 202 to various angular positions to cover about 180 degrees horizontally and vertically by repositioning the camera 104 held by the bracket 102/202 without using any tools to unscrew or pry open anything. In addition, the capability of continuously adjusting the position of the camera 104 in relation to the bracket can allow the camera 104 to aim at any direction.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A security monitoring system comprising:
a sensor including a ferromagnetic convex cover;
a magnetic bracket including a crater-shaped plate-like ring having a crater-shaped plate-like base ring and a crater-shaped plate-like cover ring with a concave surface, the crater-shaped plate-like cover ring and the crater-shaped plate-like base ring are configured to snap with each other; and
a plurality of button-shaped magnets distributed substantially uniformly between the crater-shaped plate-like cover ring and the crater-shaped plate-like base ring to thereby firmly attract the sensor at a plurality of points of the ferromagnetic convex cover when the sensor is positioned on the crater-shaped plate-like ring,
wherein the sensor is configured to be magnetically releasably mounted onto the magnetic bracket by constructing the ferromagnetic convex cover of the sensor to snug with the concave surface of the crater-shaped plate-like ring.

2. The security monitoring system of claim 1, wherein the surface curvature of the ferromagnetic convex cover matches the surface curvature of the concave surface.

3. The security monitoring system of claim 1, wherein the crater-shaped plate-like cover ring and the crater-shaped plate-like base ring each comprises a substantially uniform thickness.

4. The security monitoring system of claim 3, wherein the crater-shaped plate-like ring further comprises a plurality of magnets distributed between the crater-shaped plate-like cover ring and the crater-shaped plate-like base ring and is configured to attract the ferromagnetic convex cover of the sensor.

5. The security monitoring system of claim 4, wherein the plurality of magnets is distributed substantially uniformly between the crater-shaped plate-like cover ring and the crater-shaped plate-like base ring to thereby firmly attract the sensor at a plurality of points by the plurality of magnets when the sensor is positioned on the magnetic bracket.

6. The security monitoring system of claim 1, wherein the sensor is a camera.

7. The security monitoring system of claim 6, wherein the camera includes: (1) a generally spherical dome shaped back with the ferromagnetic convex cover; and (2) a generally flat surface with at least one sensor.

8. The security monitoring system of claim 7, wherein the camera is configured to have a field of view of about 130 degrees.

9. The security monitoring system of claim 8, wherein the camera is enabled to rotate about the magnetic bracket to various angular positions to cover about 180 degrees horizontally and vertically.

10. The security monitoring system of claim 9, wherein the magnetic bracket further comprises a mounting plate configured to be affixed to a vertical wall or a horizontal surface at various orientations.

11. A bracket for magnetically attract and releasably attach a security monitoring device having a ferromagnetic convex cover, the bracket comprising:
    a crater-shaped plate-like ring having a crater-shaped plate-like base ring and a crater-shaped plate-like cover ring with a concave surface shaped to snug with the ferromagnetic convex cover of the security monitoring device; and
    a plurality of button-shaped magnets distributed substantially uniformly between the crater-shaped plate-like base ring and the crater-shaped plate-like cover ring and configured to firmly attract the ferromagnetic convex cover of the security monitoring device at a plurality of points by the plurality of button-shaped magnets when the security monitoring device is positioned on the crater-shaped plate,
    wherein the crater-shaped plate-like cover ring and the crater-shaped plate-like base ring are adapted to snap with each other.

12. The bracket of claim 11, wherein the surface curvature of the concave surface matches the surface curvature of the ferromagnetic convex cover.

13. The bracket of claim 11, wherein the crater-shaped plate-like cover ring and the crater-shaped plate-like base ring each comprises a substantially uniform thickness.

14. The bracket of claim 13, further comprising a mounting plate configured to be affixed to a vertical wall or a horizontal surface.

15. The bracket of claim 14, wherein the mounting plate and the crater-shaped plate-like ring are structured to form an angle between the mounting plate and the crater-shaped plate-like ring.

16. The bracket of claim 15, wherein the mounting plate is adapted to be mounted on a surface in various orientations to thereby enable the security monitoring device to face various directions.

17. The bracket of claim 13 further comprising at least one slot to retain or guide a cable connected to the security monitoring device.

* * * * *